(12) United States Patent
Hayashi (10) Patent No.: US 6,349,287 B1
(45) Date of Patent: Feb. 19, 2002

(54) WORK-FLOW SUPPORT SYSTEM (75) Inventor: Shoichi Hayashi, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/119,052

(22) Filed: Jul. 20, 1998

(30) Foreign Application Priority Data

Aug. 1, 1997 (JP) .............................................. 9-220856

(51) Int. Cl.$^7$ .............................................. G06F 17/60
(52) U.S. Cl. ...................... 705/8; 705/7; 705/9; 700/99; 700/103
(58) Field of Search ...................... 705/7, 8, 9; 709/104; 700/99, 100, 101, 103

(56) References Cited

U.S. PATENT DOCUMENTS

| 5,710,921 A | * | 1/1998 | Hirose ........................ 709/106 |
| 5,826,239 A | * | 10/1998 | Davis et al. ................. 709/201 |
| 5,832,455 A | * | 11/1998 | Hayashi et al. ................ 705/7 |
| 5,878,398 A | * | 3/1999 | Tokuda et al. ................. 705/8 |
| 5,893,128 A | * | 4/1999 | Nauckhoff .................... 707/511 |
| 5,999,910 A | * | 12/1999 | Rosenfeld et al. ............. 705/7 |
| 5,999,911 A | * | 12/1999 | Berg et al. .................... 705/9 |

FOREIGN PATENT DOCUMENTS

JP   A-8-101817   4/1996

OTHER PUBLICATIONS

Alsop Michael R, workflow automation integration requires a large technology toolkit and a structured approach, computer technology review supplement pp: 23–26, 1994.*

* cited by examiner

Primary Examiner—Vincent Millin
Assistant Examiner—Hani M. Kazimi
(74) Attorney, Agent, or Firm—Oliff & Berridge, PLC (57) ABSTRACT A work-flow support having: a processing wait task storage unit that temporarily stores a task execution request and a rule interpretation execution unit executes a task corresponding to the execution request stored in the rule interpretation execution unit under the execution of another task according to rules. The rule interpretation execution unit and the task history storage unit manage history information about each task which has initiated its execution. The rule interpretation execution unit allows a task connection information storage unit to store therein connection information for connecting history information about the task corresponding to the execution request and another task to be executed to one another. When the history information about a task corresponding to a new execution request stored in the processing wait task storage unit is already stored in the task history storage unit, the rule interpretation execution unit notifies the corresponding history information to a request source of the new execution request and reflects the history information about the task corresponding to the new execution request and the history information about the already-stored task on connection information as history information about the same task.

6 Claims, 5 Drawing Sheets

FIG.1

(a) Personal monthly report creation (? Individual, ? Monthly term, ? Personal monthly report) ←
     Personal week record creation (? Individual, First week, ? Personal monthly report),
     . . . . . .
     Personal week record creation (? Individual, Fourth week, ? Personal monthly report).

(b) Personal monthly report creation (A, October term, Information storage area 1)
     Personal monthly report creation (? Individual, ? Monthly term, ? Personal monthly report) ←
     – Personal week record creation (? Individual, First week, ? Personal monthly report),
     . . . . . .
     Personal week record creation (? Individual, Fourth week, ? Personal monthly report).

(c) Personal week record creation (A, First week, Information storage area 1).
     Personal monthly report creation (A, October term, Information storage area 1)
     Personal monthly report creation (? Individual, ? Monthly term, ? Personal monthly report) ←
     Personal week record creation (? Individual, First week, ? Personal monthly report),
     . . . . . .
     Personal week record creation (? Individual, Fourth week, ? Personal monthly report).

(d) Task table

| Task ID | Task name | State | Executor | Item 1 | Item 2 | · · · · |
|---------|-----------|-------|----------|--------|--------|---------|
| 02001 | Personal monthly report creation | Executing | A | October term | Information storage area 1 | · · · · |
| 02002 | Personal week report creation | Executing | A | First week | Information storage area 1 | · · · · |

(e) Process table

| Task ID | Originating task ID |
|---------|---------------------|
| 02002 | 02001 |
| . . . . . . | |
| 02001 | 01021 |
| . . . . . . | |

FIG. 2

(a) Group monthly report creation (? Group leader, ? Monthly term, ? Group monthly report) ←
    Personal monthly record creation (A, ? Monthly term, ? Personal monthly report 1),
    . . . . . .
    Personal monthly record creation (N, ? Monthly term, ? Personal monthly report n).

(b) Task table

| Task ID | Task name | State | Executor | Item 1 | Item 2 | · · · · |
|---|---|---|---|---|---|---|
| 01021 | Group monthly report creation | Executing | B | October term | Information storage area 10 | · · · · |
| 01022 | Personal monthly report creation | Executing | A | October term | ? Personal monthly report 1 | · · · · |
| . . . . | | | | | | |
| 01030 | Personal monthly report creation | Executing | N | October term | ? Personal monthly report n | · · · · |

(c) Process table

| Task ID | Originating task ID |
|---|---|
| 01022 | 01021 |
| . . . . . . | |
| 01030 | 01021 |

(d) Connection information table

| Task ID | Task ID |
|---|---|
| 01022 | 02001 |
| . . . . . . | |

Personal monthly report acquisition (? Requester, ? Writer, ? Monthly term, ? Personal monthly report) ←
　　Personal monthly report creation (? Writer, ? Monthly term, ? Personal monthly report),
　　Acquired document confirmation (? Requester, ? Personal monthly report).

FIG. 5

WORK-FLOW SUPPORT SYSTEM

BACKGROUND OF THE INVENTION

1. Field of the Invention

This invention relates to a work-flow support system for supporting a work flow comprising a plurality of tasks which comply with rules, and particularly to a work-flow support system for supporting effective use of an already-executed task.

2. Description of the Related Art

A work-flow support system for supporting a flow of work (work flow) comprised of a plurality of jobs (tasks) has heretofore been known.

In such a work-flow support system, the work flow is represented as rules and the plurality of tasks are executed in accordance with the rules. Rule notating methods exist in a wide variety of forms according to systems but are generally ruled in such a form as to associate the respective jobs (tasks) with a process for editing an electronic mail document and define a delivery path of the electronic mail document based on a task dependent relation.

Now consider a work flow for managing each month-long report by a leader in a given group, for example. In this case, the form for the report is first created and its delivery path can be defined so that the report is sequentially delivered from the leader to each member of the group and finally returned to the leader.

However, the definition of the rules which take such a form that the document is delivered in order in time sequence, cannot represent the general structure of work. This is because such a definition is nothing but one in which the tasks that make up the work or job, are arranged in order of time considered to be typical and is separated from the work structure.

The aforementioned definition will also cause a problem in that the work structure cannot be represented obediently and the relationship of time sequence of work originally unnecessary upon the execution of the work is determined.

A system for solving this problem has been disclosed in Japanese Published Unexamined Patent Application No. Hei 8-101817 (hereinafter called "reference 1").

Figure 3:
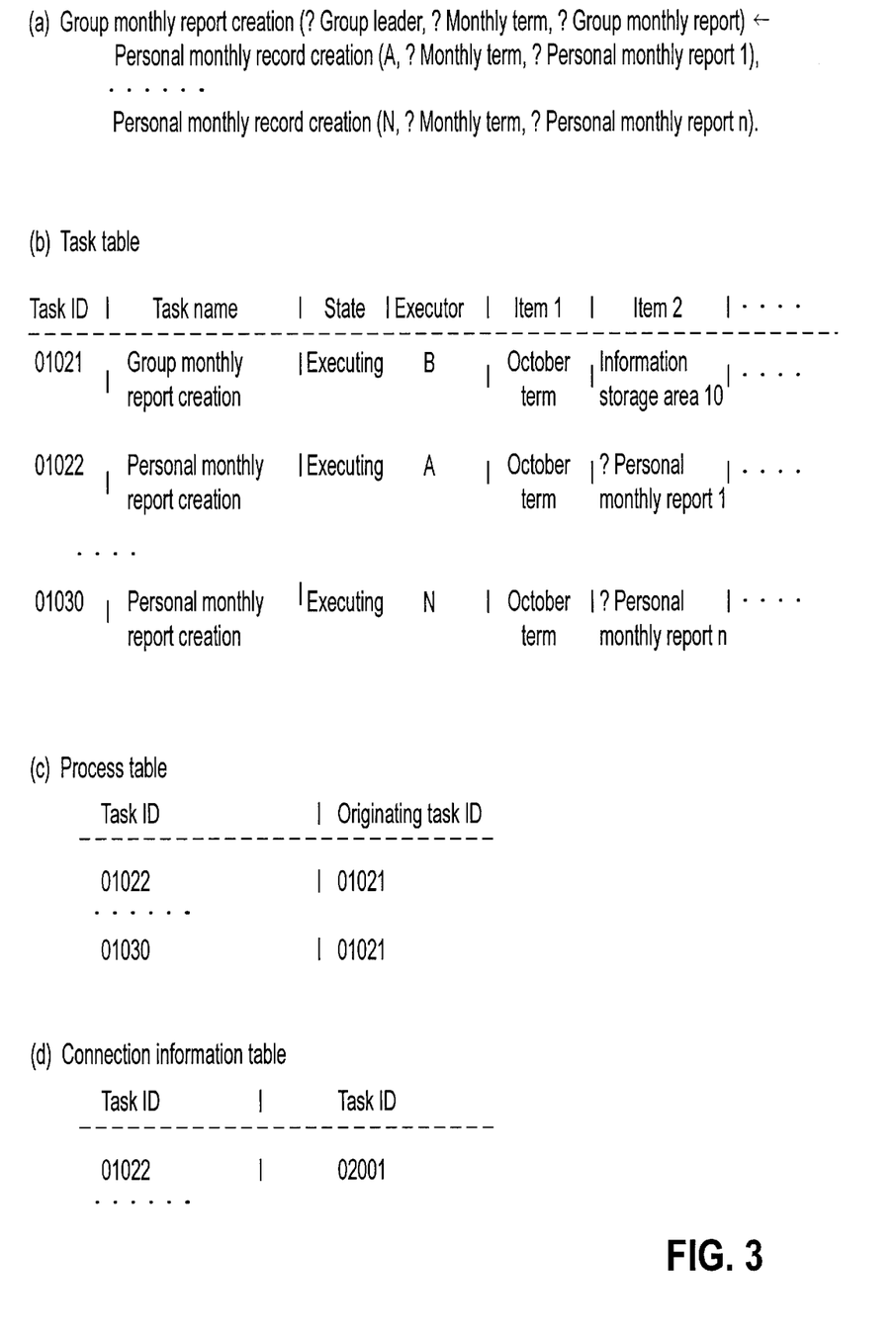
FIG. 3 is a view for describing various information held in an information processing device of Mr. B, which is employed in the embodiment shown in FIG. 1.

In a rule notating method employed in the present reference 1, each rule can be described as shown in FIG. 3(a) based on the parental relation of work except for the definition made in the above-described manner. Rules for executing tasks for personal monthly report creation based on respective members without depending on such a sequence that they are executed simultaneously (concurrently), can be described as a work flow for executing tasks for group monthly report creation based on a leader in a given group.

Figure 2:
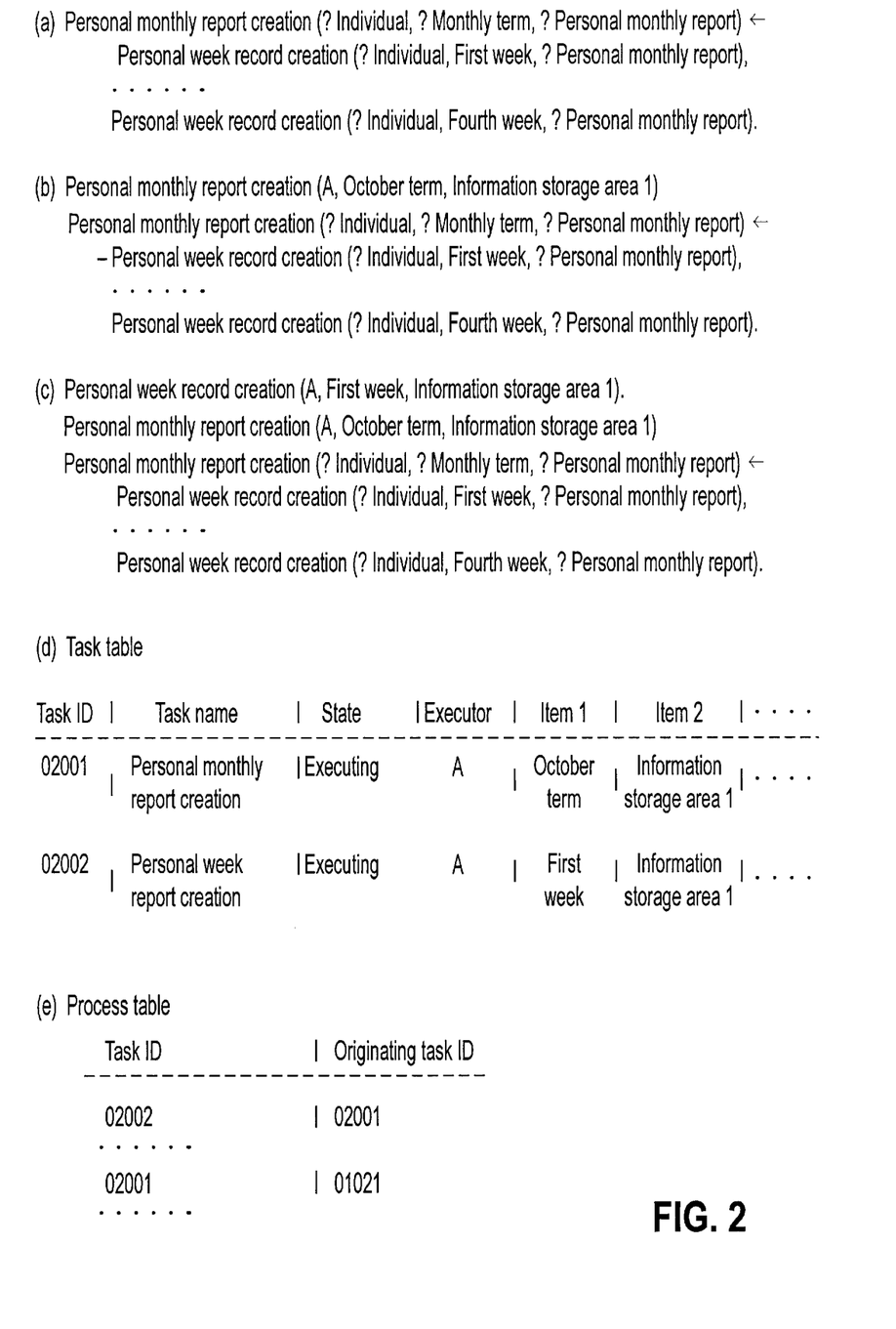
FIG. 2 is a view for describing various information held in an information processing device of Mr. A, which is employed in the embodiment shown in FIG. 1.

In the system described in the reference 1, another task described in a rule capable of unifying a condition part from a rule group upon execution of one task is automatically started up. Therefore, rules for a work flow for executing tasks for personal monthly report creation, which urge one of members to add records to a report without forgetting for each week, are described as shown in FIG. 2(a), for example. As a result, the work flow for executing the tasks for the corresponding personal monthly report creation can be automatically executed after the tasks for the aforementioned group monthly report creation are started up.

In the system shown in the reference 1 as described above, any task in the rule group may first be started up, and the rules can be freely created and executed as a work flow in which the relationship of the sequence of the respective tasks with respect to the startup is not defined and which executes tasks to which individuals are related. The present system can perform soft or flexible operation as compared with the general work-flow support system.

In a working process for successively delivering a document among a plurality of persons, a process in which a document-received person refers to the already-described document and desires the previous person to modify it, repeatedly occurs.

Upon such a condition, the system shown in the reference 1 can automatically perform process repetition upon execution even when the rules for the work flow are linearly defined by a backtrack mechanism due to a failed state. Since a large-scale workflow is realized as a small rule group, it can be partially executed and hence a partial task based on a re-trial can be repeatedly executed.

Thus, the work-flow system having flexibility is used not only in a routine job like a slip process but also in other jobs. The work-flow system is to be used even in such a job that, for example, several persons jointly write a document, a book, specifications, a program, etc.

When the plurality of users write them in cooperation, the desire to manage an intermediate product as well as the final product (result document) is produced. As a system that meets such a desire or request, one called generally "version management system" already exists.

As described above, the system described in the reference 1 will cause the following problems although it can provide soft operation.

For example, the work flow for executing the tasks for the above-described group monthly report creation is normally executed at the end of the month in which a monthly report is made consciously, whereas the work flow for executing the tasks for the personal monthly report creation might be executed prior to the work flow.

On the other hand, when a plurality of work-flows, which share the use of some task, are defined, the shared task might be executed previously by other work-flows.

Thus, the tasks constituting some of the work flow for executing the given task may very well turn out to be started up precedently on a time basis. The tasks for the above-described group monthly report creation will be explained by way of example when such a condition occurs. Even though the members have already created their own monthly reports in accordance with the tasks for the personal monthly report creation, the tasks for the personal monthly report creation are executed again according to the work flow for executing the tasks for the leader-based group monthly report creation. Thus, excess working such as the transfer of the contents of the already-created report to the form of each monthly report delivered from the leader, etc. will occur.

Although one having the function of tracing the states of the respective tasks along the work flow exists as the work-flow system, the already-executed tasks are treated as unrelated to the subsequent work flow. Therefore, the paths of tracing of tasks related to the already-executed tasks will fall into a cut-off state.

The normal work-flow system other than the system shown in the reference 1 cannot solve the above-described problems, either.

When the version management system is used for the desire to manage the intermediate product in the work-flow support system, the user must manage the correlation of products of the two systems with their management information manually or by another method because the version management system exists separately from the work-flow support system.

SUMMARY OF THE INVENTION

With the foregoing in view, it is therefore an object of the present invention to provide a work-flow support system capable of easily and suitably connecting a task executed precedently on a time basis to a subsequently executed work flow.

It is another object of the present invention to provide a work-flow support system capable of easily managing a product based on a task at the occurrence of re-execution when the re-execution for a given task occurs.

According to one aspect of this invention, for achieving the above objects, there is provided a work-flow support system for supporting a work flow comprised of a plurality of tasks defined according to rules, comprising:

an execution request receiving unit for accepting a task execution request;

a processing wait task storing unit for temporarily storing the accepted task execution request;

a rule interpretation executing unit for executing a task corresponding to the stored execution request under the execution of another task according to rules;

a history managing unit for managing history information about the executed task; and a task history unifying unit for, when history information about a task corresponding to the new execution request stored in the processing wait task storing unit is already stored in the history storing unit, notifying the corresponding history information to a request source for the new execution request.

Now, the term history information indicates information such as information for specifying a result obtained by the execution of each task, information about the state of execution of each task or the like.

In the work-flow support system according to the present invention, basically, the execution request receiving unit accepts a task execution request, the processing wait task storing unit temporarily stores the task execution request accepted by the execution request receiving unit, the rule interpretation executing unit executes a task corresponding to the stored execution request under the execution of another task according to rules, and the history managing unit manages history information about the task corresponding to the execution request.

When the history information about the task corresponding to the new execution request stored in the processing wait task storing unit is already stored in the history storing unit, the task history unifying unit notifies the corresponding history information to a request source for the new execution request.

Thus, the history information about the task executed precedently on a time basis can be notified to the task execution request source without having to re-execute the task.

According to another aspect of this invention, there is provided a work-flow support system further comprising a rule group storing unit for holding rules which define other tasks to be executed to execute a given task, and a connection information storing unit for storing therein connection information for connecting history information about related tasks to one another. The rule interpretation executing unit further allows the connection information storing unit to store connection information for connecting history information about a task corresponding to an execution request and another task to be executed. When history information about a task corresponding to a new execution request stored in the processing wait task storing unit is already stored in the history storing unit, the task history unifying unit further reflects the history information about the task corresponding to the new execution request and the history information about the already-stored task on the connection information as history information about the same task.

In the work-flow support system referred to above, the rule interpretation executing unit allows the connection information storing unit to store connection information for connecting history information about a task corresponding to an execution request and another task to be executed.

When history information about a task corresponding to a new execution request stored in the processing wait task storing unit is already stored in the history storing unit, the task history unifying unit reflects the history information about the task corresponding to the new execution request and the history information about the already-stored task on the connection information as history information about the same task.

Thus, history information about a task that belongs to a work flow including each task executed precedently on a time basis can be connected to history information about a task that belongs to another work flow including the executed task. For example, history information about related tasks can be obtained as is the case in which history information about a subtask of a precedently-executed task can be obtained from the side in which an execution request for the precedently-executed task is subsequently done.

According to a further aspect of this invention, there is provided a work-flow support system further comprising a saving unit for, when a re-execution request for a task already executed by an execution request receiving unit is accepted, saving document information included in history information related to the corresponding task.

In the work-flow support system referred to above, when a re-execution request for a task already executed by the execution request receiving unit is accepted, the saving unit saves document information included in history information related to the corresponding task.

Thus, the document information related to the task prior to the re-execution, can be saved and put to use or the like subsequently.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DETAILED DESCRIPTION OF THE PREFERRED EMBODIMENTS

Figure 1:
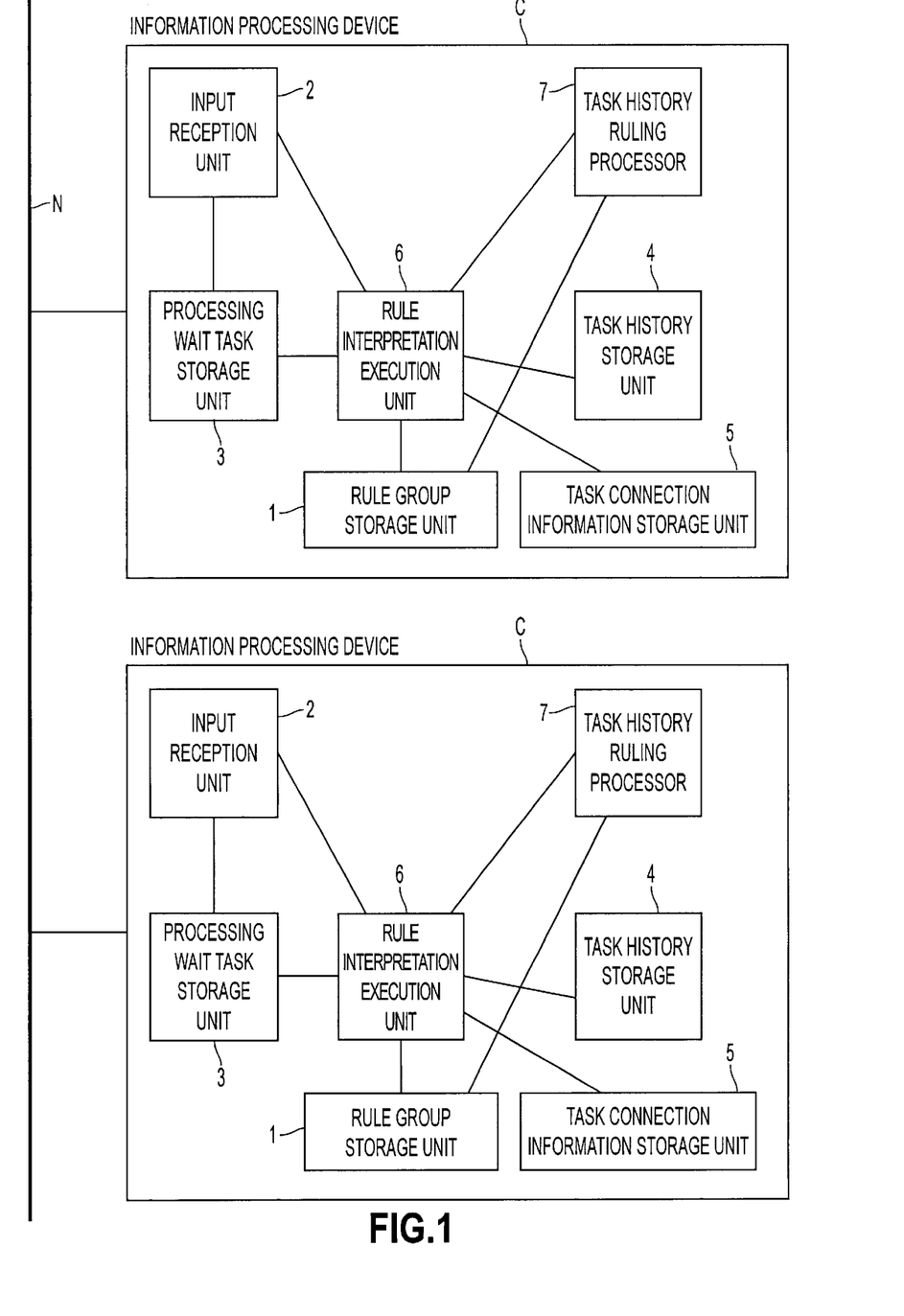
FIG. 1 shows a part of a work-flow support system according to one embodiment of the present invention.

One embodiment of a work-flow support system according to the present invention will be described with reference to FIG. 1. Incidentally, the same drawing shows a part of the work-flow support system.

The present work-flow support system comprises a plurality of information processing devices C with a network N interposed therebetween. Each of the information processing devices C has a rule group storage unit 1, an input reception unit 2, a processing wait task storage unit 3, a task history storage unit 4, a task connection information storage unit 5, a rule interpretation execution unit or executor 6, and a task history ruling processing unit or processor 7.

The rule group storage unit 1 holds rules for implementing a work flow defining another task to be executed to execute a given task.

As shown in FIG. 2(a), the present embodiment includes a condition part in which conditions for a task to which the corresponding rules are applied, have been described, and an execution part in which another task to be executed has been described. Incidentally, the H description antecedent to "←" in the same drawing corresponds to the condition part, and the description subsequent to "←" in the drawing corresponds to the execution part.

Now, the description prior to the parentheses indicates a task name. A first argument in the parentheses represents a person who executes the corresponding task. Arguments subsequent to a second argument indicate input/output information necessary for the corresponding task or information for specifying electronic documents.

The symbol "?" in the respective arguments indicate variables. Variable names under rules may indicate the relationship in which ones of the same name have the same values. Their names themselves may be abandoned after rule's application.

Further, symbol "←" indicates an implication (if-then), for example, it shows that "a←b, c." means that if "b" and "c", then it is "a".

If a verification process using this backward reasoning is interpreted on a procedural basis, then "b" and "c" must be achieved to achieve (verify) "b". Therefore, when a task of "a" is started up (produced as having to be accomplished), this means the starting up of tasks of "b" and "c". Incidentally, "b" and "c" are allowed to be executed simultaneously (in parallel).

The rule group storage unit 1 holds therein a rule given in a format like "personal_monthly_report_creation(A, October_term, information_storage_area_1)." which is created by the task history ruling processor 7. This rule is equivalent to "personal_monthly_report_creation(A, October_term, information_storage_area_1)←true." predicate "true" having the meaning that it is immediately achieved. Incidentally, the present rule will hereinafter be called "fact format rule".

The present fact format rule is defined as a rule capable of specifying history information about a task fit to the condition part in the corresponding rule from the task history storage unit 4. The fact format rule has the function of allowing the rule interpretation execution unit 6 to perform the following processing.

Namely, the rule interpretation execution unit 6 includes the function of retrieving the task connection information storage unit 5 used as an execution request source for a task to which the corresponding rule is applied, to obtain a task ID indicative of an originating task defined as a task corresponding to the corresponding execution request, associating the corresponding task ID and a task ID indicative of a task about history information specified by the corresponding rule with one another as the parental relation and adding it to the task connection information storage unit 5 on the reception side of the execution request, and the function of attaching the task ID indicative of the task about the history information specified by the corresponding rule to history information about the task to which the corresponding rule is applied and notifying the result of attachment to a request origin or source.

In response to a task execution request, the input reception unit 2 causes the processing wait task storage unit 3 to store the corresponding execution request therein.

When a once-executed task's re-execution request is made, the input reception unit 2 accepts the re-execution request according to the change of a state in history information notified by its execution to "re-execution" and allows the processing wait task storage unit 3 to store the state-changed history information therein as the execution request.

Further, when the input reception unit 2 receives the re-execution request therein, it displays and outputs an applicable rule notified from the rule interpretation execution unit 6 as will be described later. Further, the input reception unit 2 accepts a user-selected input with respect to the rule and notifies the received rule to the rule interpretation execution unit 6.

The processing wait storage unit 3 temporarily stores therein a task execution request issued from the input reception unit 2 or the rule interpretation execution unit 6.

The task history storage unit 4 stores history information about tasks therein as a task table shown in FIG. 2(d).

The task table includes a task ID, a task name, a state, an executor, and a plurality of items.

The task ID indicates a unique value for identifying each task, which is employed in the corresponding work-flow support system. Incidentally, the present value can be easily produced by utilizing an address for uniquely specifying the corresponding environment on the network and a unique value placed under the corresponding environment in combination, for example.

The task name corresponds to the name given to the corresponding task. Incidentally, even if the corresponding task name is the same, it is not regarded as the same task when the subsequent executors or items vary.

The state represents the state of the corresponding task and may includes, for example, execution waiting, during-execution, the completion of execution, re-execution, a failure or the like.

The executor indicates an executor who is to execute the corresponding task.

The plurality of items correspond to information necessary for the corresponding task, e.g., information for specifying document information used in the input/output, etc. In the present embodiment, the items are given as region or area names with document information stored therein.

The task connection information storage unit 5 stores connection information for connecting pieces of history information about related tasks to one another therein as a process table and a connection information table shown in FIGS. 3(c) and 3(d).

The process table stores therein the correspondence of a task ID of a given task and a task ID of an originating task that allowed the execution of the corresponding task.

The connection information table stores therein the correspondence between task IDs of tasks determined to be the same task.

The rule interpretation execution unit 6 takes out or extracts the corresponding task execution request from the processing wait task storage unit 3 and performs the following SLD resolution process.

Namely, when the state of "re-execution" is included in the execution request extracted from the processing wait task storage unit 3, the rule interpretation execution unit 6 performs a process for saving document information included in the execution request and thereafter retrieves a rule fit for the execution request from the rule group storage unit 1. Further, the rule interpretation execution unit 6 notifies the result of retrieval to the input reception unit 2 corresponding to the request source from which the execution request has been made, and specifies a rule on the basis of the notification issued from the input reception unit 2.

On the other hand, when the state of the execution request extracted from the processing wait task storage unit 3 is other than "re-execution", the rule interpretation execution unit 6 retrieves the leading rule suitable for the execution request from the rules stored in the rule group storage unit 1 and specifies it.

When no suitable rules exist, the rule interpretation execution unit 6 notifies the corresponding execution request to an executor or executor address included in the corresponding execution request and causes an executor himself or herself to perform processing to execute the corresponding task.

The conformance or fitness of the rule to the execution request indicates a state in which the task names of the execution request and the condition part in the rule are the same and although respective items are coincident or inconsistent with each other, one of the items is a variable or both the items are variables.

If one thereof is a variable and the other thereof is a constant with respect to the same items upon its conformance, then the variable is converted to the constant. If both the items are variables, then they are defined as the same variable and reflected on the subsequent processing.

When, for example, each item on the rule side is given as a constant and the execution request is given as each variable, the variable of the execution request is replaced by the constant in the rule, which thereafter is reflected on a task table. On the other hand, when each item on the rule side is given as the variable and the execution request is given as each constant, all the variables of the same variable name in the rule are replaced by the constants indicative of the execution request and the replaced rule is reflected on the subsequent process as a rule for the corresponding execution request.

When the specified rule does not correspond to the fact format rule, an execution request for other tasks described in the execution part of the rule is stored in the processing wait task storage unit 3. Further, a task ID of an extracted task and a task ID of a task subjected to an execution request in accordance with a rule are stored in the process table so as to correspond to each other. After the corresponding task has been completed, history information about the corresponding task is notified to the request source.

On the other hand, when the specified rule corresponds to the fact format rule, the function of the corresponding rule is executed.

The rule interpretation execution unit 6 accepts history information about a reply to a task that has made an execution request to the rule interpretation execution unit 6 including another information processor. When a task ID of a task other than the required task is attached to the corresponding result, the rule interpretation execution unit 6 adds the task ID corresponding to the execution request and the task ID attached to the history information to the connection information table as tasks ID each indicative of the same task.

The task history ruling processor 7 creates a fact format rule, based on the task whose execution is started by the rule interpretation execution unit 6, and causes the rule group storage unit 1 to additionally store it therein.

A process for additionally storing the rule is similar to that which executes, for example, "?-asserta(personal_monthly_report_creation(A, October_term, information_storage_area_1)).", based on a built-in predicate accompanied by a side effect with a name generally called "asserta" in a Prolog language.

The operation of the work-flow support system will next be described.

The description of the operation thereof will be made of, as an example, the case in which information processing devices are assigned for every members, and the rules shown in FIG. 2(*a*) are stored in a rule group storage unit 1 of an information processing device of Mr. A and the rules shown in FIG. 3(*a*) are stored in a rule group storage unit 1 of an information processing device of Mr. B as a group leader.

Now consider that Mr. A first inputs an execution request of a task "personal_monthly_report_creation (A, October_term, information_storage_area_1)" to the input reception unit 2 for him at the beginning of October.

In this case, an execution request is stored in the processing wait task storage unit 3 by the input reception unit 2. Further, a record of a task ID "02001" shown in FIG. 2(*d*) is registered in a task table of the task history storage unit 4 when execution is initiated.

Figure 4:
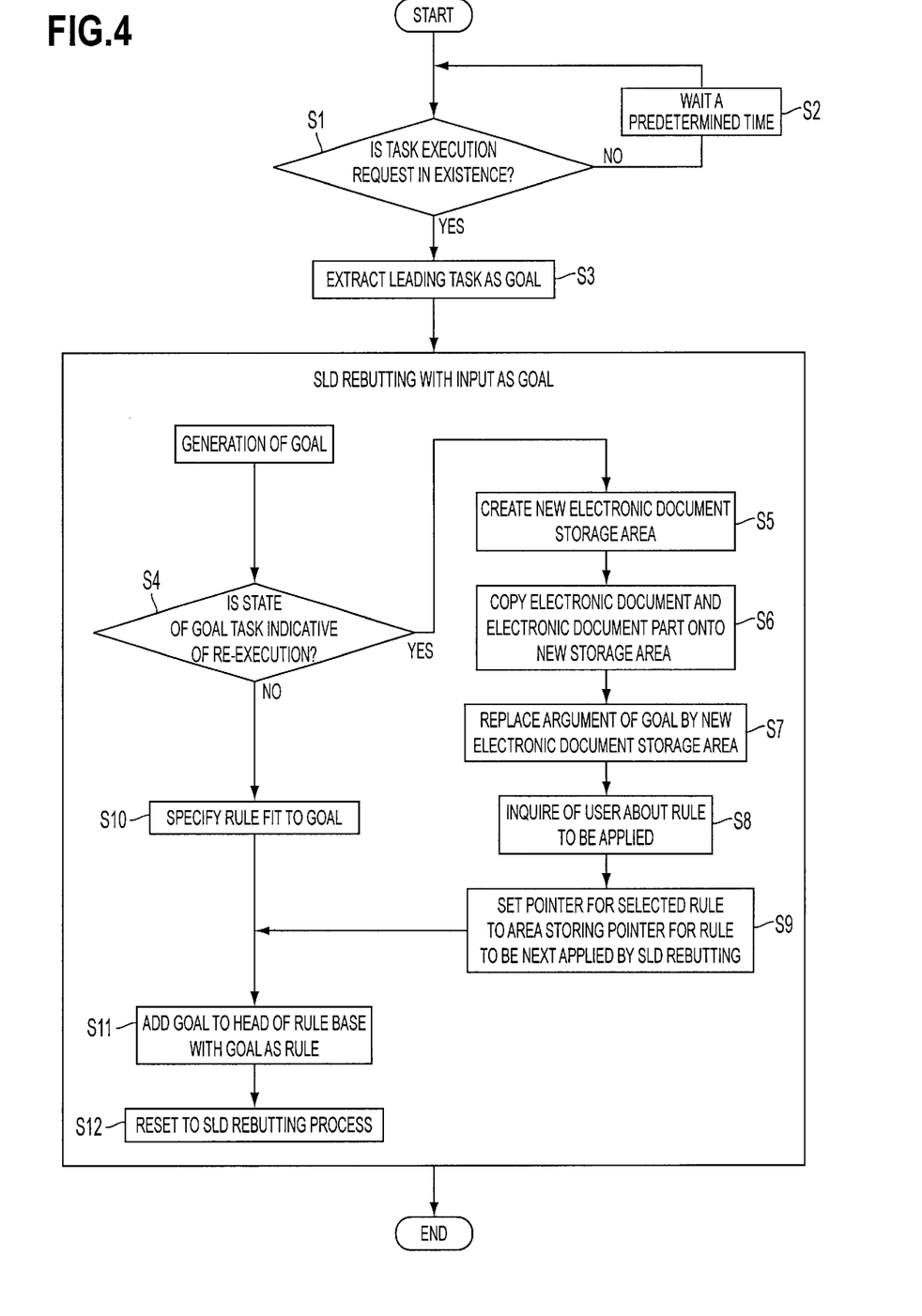
FIG. 4 is a flowchart showing a process executed centering around a rule interpretation execution unit employed in the embodiment shown in FIG. 1.

On the other hand, a process shown in FIG. 4 is performed centering around the rule interpretation execution unit 6.

Namely, the rule interpretation execution unit 6 detects whether an execution request exists in the processing wait task storage unit 3 for each predetermined time (Steps S1 and S2). When the answer is found to be YES in Step S1, the rule interpretation execution unit 6 takes out or extracts the corresponding execution request from the processing wait task storage unit 3 as a goal (final object in the SLD resolution process) (Step S3) and performs the SLD resolution process.

Upon executing the SLD resolution process, the rule interpretation execution unit 6 first detects whether or not a state "re-execution" is included in the goal (Step S4).

When the answer is found to be YES in Step S4, the rule interpretation execution unit 6 performs a saving process for holding the electronic document used in the previously-executed task.

Namely, the rule interpretation execution unit 6 ensures a region or area for storing a new electronic document, copies the electronic document used in the preceding task onto the ensured area, and replaces an item indicative of an area name of an electronic document included in the goal with the newly-copied area name (Steps S5 through S7).

Next, the rule interpretation execution unit 6 retrieves a rule fitted to the goal from the rule group storage unit 1 and notifies it to the input reception unit 2 corresponding to the request source to accept an input selected by a user, thereby specifying the rule inputted by the user (Steps S8 and S9).

On the other hand, when the answer is found to be NO in Step S4, the rule interpretation execution unit 6 retrieves a rule suitable for the goal from the rule group storage unit 1 to specify the rule (Step S10).

When the rule is specified, the task history ruling processor 7 adds the goal to and store it in the rule group storage unit 1 (Step S11) and continues the SLD resolution process (Step S12).

According to the above-described process, when the above execution request is made, the corresponding execution request is taken out as the goal. Further, since the corresponding goal does not include the state "re-execution", the rule interpretation execution unit 6 retrieves the rule fitted to the execution request from the rule group storage unit 1 and specifies it.

Thus, the rules shown in FIG. 2(d) are specified as conformable.

Now, the rule interpretation execution unit 6 converts variables "?person", "?monthly_term", "?personal_monthly_report" in each rule to constants "A", "October_term", and "information_storage_area_1" respectively.

The task history ruling processor 7 adds the corresponding goal to the leading portion or head of a rule group stored in the rule group storage unit 1 as the fact format rule as shown in FIG. 2(b).

Next, the rule interpretation execution unit 6 allows the processing wait task storage unit 3 to store the initial task described in the execution part of the aforementioned specified rule therein as an execution request.

Thus, history information about this task is registered into the task history storage unit 4 as a record of a task ID "02002" shown in the task table illustrated in FIG. 2(d).

The rule interpretation execution unit 6 stores the task ID "02001" of this task and the task ID "02002" of the task subjected to the execution request by the corresponding task in the process table as shown in FIG. 2(e). As a result, history information about the tasks related to each other can be connected with each other.

Further, the task execution request for the aforementioned task ID "02002" is also taken out as a goal and executed by the rule interpretation execution unit 6.

Since no rule is described in this task, the rule interpretation execution unit 6 executes it by allowing the executor "A" (i.e., Mr. A) to process it.

Even in the case of this task, the task history ruling processor 7 adds the corresponding goal to the head of the rule group of the rule group storage unit 1 as the fact format rule as shown in FIG. 2(c).

As described above, the same processing as described above is performed on another task described in the rule and hence the task "personal_monthly_report_creation(A, October_term, information_storage_area_1)" is executed.

Now consider that Mr. B of the group leader inputs an execution request indicative of a task "group_monthly_report_creation(B, October_term, information_storage_area_10)" through the input reception unit 2 near the end of the same month.

In doing so, the information processing device of Mr. B specifies each rule shown in FIG. 3(a) as suitable for the execution request in accordance with a process similar to that carried out by the above-described information processing device of Mr. A. As a result, the corresponding rule is processed. Thus, a task table stored in a task history storage unit 4 of the information processing device of Mr. B is given as shown in FIG. 3(b) and a process table stored in a task connection information storage unit 5 is given shown in FIG. 3(c).

Since the task "personal_monthly_report_creation(A, October_term, ?personal_monthly_report_1)" in the rule is carried out by Mr. A as the executor upon the above-described SLD resolution process, the execution request for the corresponding task includes a task ID "01022" of the corresponding task and is transmitted to the processing wait task storage unit 3 in the information processing device of Mr. A.

When the task execution request is transmitted to the information processing device of Mr. A, the information processing device of Mr. A executes a task which falls under the corresponding execution request.

Namely, the rule interpretation execution unit 6 in the information processing device of Mr. A retrieves and specifies a rule fit for the execution request. At this time, a fact format rule like "personal_monthly_report_creation(A, October_term, information_storage_area_1)." is specified. Thus, when the fact format rule is specified, this means that the corresponding task has already been carried out.

Now, the value of a variable "?personal_monthly_report_1" included in the execution request is converted to a constant "information_storage_area_1".

Further, the rule interpretation execution unit 6 executes the function held by the corresponding fact format rule.

Namely, the rule interpretation execution unit 6 retrieves the process table shown in FIG. 3(c) stored in the task connection information storage unit 5 in the information processing device of Mr. B to acquire or obtain a task ID "01021" of an originating task indicative of the task corresponding to the execution request. Further, the rule interpretation execution unit 6 defines the corresponding task ID "01021" as an originating task for a task ID "02001" of a task specified by the corresponding rule in association with each other. Thereafter, the corresponding task ID "01021" is added to the process table of the task connection information storage unit 5 as shown in FIG. 2 (e). The task ID "02001" of the task specified by the corresponding rule is added to history information "personal_monthly_report_creation (A, October_term, information_storage_area_1)" to which the corresponding rule is applied, after which it is notified to the information processing device of Mr. B.

Since the task ID "02001" of another task is added to the history information, the rule interpretation execution unit 6 of the information processing device of Mr. B makes the correspondence between the corresponding task ID "02001" and a task ID "01022" of a task corresponding to his own execution request and stores it in the connection information table of the task connection information storage unit 5.

Thus, when Mr. A has already executed the task subjected to the execution request by Mr. B, the history information "personal_monthly_report_creation(A, October_term, information_storage_area_1)" of the corresponding task is fed back to Mr. B even if nothing is done by Mr. A. If a report is already stored in the "information storage area 1" in this history information, then Mr. B is able to take out the report.

Further, Mr. B can grasp, for example, the task being in execution by referring to the state in the history information.

By utilizing the process tables and connection information tables of the information processing devices that belong to Mr. A and Mr. B, Mr. B can make a reference or the like to history information about a task related to the task which is included in his own execution request and has already been executed. On the other hand, Mr. A is able to make a reference or the like to history information about a task related to the subsequently-required task executed by himself.

For example, Mr. B can obtain a task ID "02001" of the corresponding already-executed task from the connection information table of his own information processing device in accordance with the task ID "01022" of the task to which the execution request has been made. Further, Mr. B can obtain a task ID "02002" of a subtask from the process table of the information processing device of Mr. A in accordance with the task ID "02001" and is able to acquire history information about this task in accordance with the corresponding task ID "02002" by retrieving the task history storage unit 5 in the information processing device of Mr. A.

In accordance with the task ID "02001" of the task subjected to the execution request, Mr. A can obtain a task ID "01021" of an originating task that has requested the corresponding task subsequently, by referring to the process table in his own information processing device. Thus, Mr. A is able to obtain task history information from the task ID "01021".

Thus, the work flow including the already-executed tasks, and history information about tasks which belong to the work flow including the tasks, can be easily traced.

In the above-described embodiment, the task ID is used as the connection information for representing that the history information is one for the same task. However, the present embodiment is not limited to this. For example, the "personal_monthly_report_creation (A, October_term, information_storage_area_1)" may be used, in short, any may be used as long as it is ensured that the history information for the same task can be uniquely taken out.

A description will next be made of re-execution carried out when, for example, an unsatisfiable portion exists in a Mr. A report obtained by execution once and Mr. B desires to modify it.

When the above-described group monthly creation task is executed, the history information "personal_monthly_report_creation(A, October_term, information_storage_area_1)" is returned to Mr. B. This history information includes a state "attainment" (true logically upon SLDresolution) or the like.

When Mr. B refers to a report in a region or area given by an area name "information_storage_area_1" included in the history information backed as a result but cannot satisfy it, the state in the corresponding history information returned by the input reception unit 2 is reset to "re-execution" so that the corresponding task can be re-executed.

Namely, the input reception unit 2 receives a request for the re-execution according to the change of the state to the "re-execution" and allows the processing wait task storage unit 3 to store the history information brought to the state "re-execution" therein as an execution request. Subsequently, the rule interpretation execution unit 6 executes the corresponding execution request.

Now, the rule interpretation execution unit 6 checks for each item of a task while being in the execution request and thereby finds that an area name "information_storage_area_1" indicative of a storage area in an electronic document exists. Therefore, the rule interpretation execution unit 6 creates a new area "information_storage_area_1.1" and copies the electronic document existing in the "information_storage_area_1" onto an area specified by the area "information_storage_area_1.1". Thereafter, the rule interpretation execution unit 6 transmits the execution request to the information processing device of Mr. A as "personal_monthly_report_creation(A, October_term, information_storage_area_1.1)". Incidentally, the rule interpretation execution unit 6 transmits it inclusive of the state indicative of the "re-execution".

The rule interpretation execution unit 6 in the information processing device of Mr. A accepts the transmitted execution request therein. Since the state "re-execution" is included therein, the rule interpretation execution unit 6 retrieves an applicable rule and accepts an input obtained by selecting a rule to which the corresponding rule is applied by the input reception unit 2 of the information processing device of Mr. B, thereby performing SLD rebutting using the selected rule.

Although the Mr. A has the potential for editing the electronic document in the "information_storage_area_1.1" according to the present SLD resolution, the electronic document created upon the previous execution can be held in the "information_storage_area_1" as it is.

Since the re-execution can be performed by changing the applied rule, a user is able to finely control the execution of each task.

Further, the task can be repeatedly performed until the satisfactory result is obtained between the task requester and the task executor. Namely, the task can be carried out repeatedly even in the case of a rule descriptive of the linear flow of tasks.

When the above re-execution is repeatedly performed, electronic documents (products) created each time the execution is carried out, are held and hence fact format rules for indicating the corresponding products are successively stored in the rule group storage unit 1. If attention is focused on the fact format rules, then they are arranged in the rule group storage unit 1 in order from rules indicating new products on a time basis.

A case in which Mr. C refers to a Mr. A report in the October term after the time has elapsed for a while, will now be explained by way of example as a case in which he refers to the past document.

In this case, Mr. C describes rules shown in FIG. 5 in advance and allows the rule group storage unit 1 to hold them therein. In this condition, Mr. C may input an execution request "personal_monthly_report_acquisition(C, A, October_term, ?_)" to the input reception unit 2.

Figure 5:
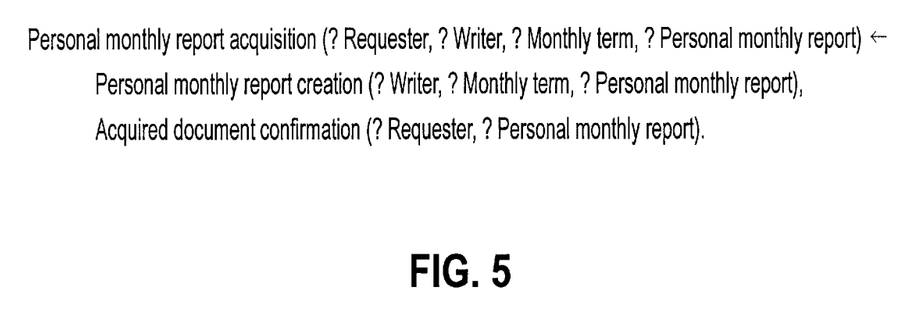
FIG. 5 is a rule used when one refers to the past document employed in the embodiment shown in FIG. 1.

Thus, the rule interpretation execution unit 6 sends back history information about task "personal_monthly_report_creation" to Mr. C and further requests Mr. C himself to execute a process of a task "acquired_document_confirmation".

If Mr. C sets a task state of the task "acquired_document_confirmation" as a failure when the report indicated by the history information obtained from the task "personal_monthly_report_creation" is not a product desired by Mr. C at this time, then the rule interpretation execution unit 6 applies a rule next to the previously-executed rule to the task "personal_monthly_report_creation", sends back the history information to Mr. C again, and requests Mr. C to execute the process for the task "acquired_document_confirmation" again.

Thus, when a plurality of versions exist in the corresponding report, a report given in a desired version can be acquired by repeatedly performing the above-described processing.

It is desirable that such well-used rules are prepared in advance. A plurality of persons can utilize the prepared rules with efficiency by determining task naming rules.

Let's now take a look at the representations of the above-described rules. Any of processes executed by the rule interpretation execution unit 6, such as a process for a request of document creation to a given user, a process for submitting the already written document, and a process for retrieving a necessary document from the already-written documents can be performed in exactly the same rule representation.

Thus, the user needs not go to the trouble like the proper use of rule representation according to the processing by the rule interpretation execution unit 6.

In the aforementioned embodiment, the rule interpretation execution unit 6 executes each rule created by the task history ruling processor 7 to thereby form a task history unifying unit as defined in claims. However, the present embodiment is not necessarily limited to this. The task history unifying unit may be formed by another functional part.

In the aforementioned embodiment, the respective information processing devices are similarly provided with the functional parts respectively. However, the present embodiment is not necessarily limited to such a configuration. For example, one information processing device may be configured to have a rule group storage unit, whereas other information processing devices may be configured so as to be able to utilize the corresponding rule group storage unit. In short, the respective functional parts may be provided in any device if the respective information processing devices can utilize the functions of the respective functional parts.

Further, the plurality of information processing devices are used in the above-described embodiment. However, the present invention can be applied even to a single information processing device.

The respective function unit are configured by executing control programs (stored in a ROM, a RAM or the like in advance) with a processor. In the present invention, however, these function units may be configured as separate hardware circuits.

In the present invention, the processing according to the present invention may be executed by grasping the above-described control programs as a computer-readable storage medium such as a floppy disk, a CD-ROM or the like, reading the corresponding control programs from the storage medium, and causing a processor to execute the control programs.

In the work-flow support system according to the present invention, as has been described above, when history information about a task corresponding to a new execution request is already present, the corresponding history information is notified to a request source of the new execution request. Therefore, history information about a task executed precedently on a time basis can be notified to the task execution request source without re-executing the task, whereby working is not forced on a user.

In the work-flow support system according to the present invention as well, history information about a task corresponding to an execution request and history information about another task to be executed are associated with each other. Further, when history information about a task corresponding to a new execution request is already present, the history information about the task corresponding to the new execution request and the history information about the already-existing task are associated with each other as history information about the same task. Therefore, history information about a task that belongs to a work flow having executed a task precedently on a time basis, can be linked or connected to history information about a task that belongs to another work flow including the above executed task, whereby the work-flow support system can trace history information about related tasks.

Further, since the previous execution result is saved when a re-execution request is made to an once-executed task, the work-flow support system according to the present invention can make its use or the like subsequently.

While the present invention has been described with reference to the illustrative embodiment, this description is not intended to be construed in a limiting sense. Various modifications of the illustrative embodiment will be apparent to those skilled in the art on reference to this description. It is therefore contemplated that the appended claims will cover any such modifications or embodiments as fall within the true scope of the invention.

What is claimed is:

1. A work-flow support system for supporting a work flow including a plurality of tasks defined according to rules, comprising:

an execution request receiving unit that accepts a task execution request;

a processing wait task storing unit that temporarily stores the accepted task execution request;

a rule interpretation executing unit that executes a first task corresponding to the stored execution request under the execution of a second task according to rules;

a history managing unit that manages history information about the first task;

a task history unifying unit that provides, if history information about a task corresponding to a new execution request stored in said processing wait task storing unit is already stored in said history managing unit, the corresponding history information to a request source for the new execution request;

a rule group storing unit that stores rules which define other tasks to be executed to execute a given task; and a connection information storing unit that stores connection information for connecting history information about related tasks to one another;

wherein said rule interpretation executing unit further allows said connection information storing unit to store connection information for connecting history information about a task corresponding to an execution request and another task to be executed, and if history information about a task corresponding to a new execution request stored in said processing wait task storing unit is already stored in said history storing unit, said task history unifying unit further reflects the history information about the task corresponding to the new execution request and the history information about the already-stored task on said connection information as history information about the same task.

2. The work-flow support system according to claim 1, further comprising:

an execution method receiving unit that displays and outputs a rule which matches an execution request and that accepts the selection of a rule for forcing obedience on said rule interpretation executing unit, and wherein said rule interpretation executing unit executes a corresponding task in accordance with the corresponding accepted rule.

3. The work-flow support system according to claim 2, further comprising:

a backup unit that backs up, if a re-execution request for a task already executed by said execution request receiving unit is accepted, document information included in history information related to the corresponding task.

4. A work-flow support system for supporting a work flow including a plurality of tasks defined according to rules, comprising:

an execution request receiving unit that accepts a task execution request;

a processing wait task storing unit that temporarily stores the accepted task execution request;

a rule interpretation executing unit that executes a first task corresponding to the stored execution request under the execution of a second task according to rules;

a history managing unit that manages history information about the first task;

a task history unifying unit that provides, if history information about a task corresponding to a new execution request stored in said processing wait task storing unit is already stored in said history managing unit, the corresponding history information to a request source for the new execution request;

a rule group storing unit that stores rules which define other tasks to be executed to execute a given task; and a connection information storing unit that stores connection information for connecting history information about related tasks to one another;

a task history ruling unit that creates as rules, if history information about a task corresponding to a new execution request stored in said processing wait task storing unit is already stored in said history storing unit, at least one of a function of providing the corresponding history information to a request source for the new execution request by said task history unifying unit or a function of reflecting history information about a task corresponding to the new execution request and history information about the already-stored task on said connection information as history information about the same task and allowing said rule group storing unit to store the rules therein, and wherein said task history unifying unit executes the corresponding function according to the execution of the rules created by said task history ruling unit by said rule interpretation executing unit.

5. The work-flow support system according to claim 4, further comprising:

an execution method receiving unit that displays and outputs a rule which matches an execution request and that accepts the selection of a rule for forcing obedience on said rule interpretation executing unit, and wherein said rule interpretation executing unit executes a corresponding task in accordance with the corresponding accepted rule.

6. The work-flow support system according to claim 5, further comprising:

a backup unit that backs up, if a re-execution request for a task already executed by said execution request receiving unit is accepted, document information included in history information related to the corresponding task.

* * * * *